United States Patent [19]
Lundberg et al.

[11] Patent Number: 6,121,356
[45] Date of Patent: Sep. 19, 2000

[54] PLASTICIZED SULFONATED IONOMERS

[75] Inventors: Robert Dean Lundberg, Williamsburg, Va.; Dennis George Peiffer, Annandale; Robert Richard Phillips, Spring Lake Heights, both of N.J.

[73] Assignee: Exxon Research and Engineering Company, Florham Park, N.J.

[21] Appl. No.: 08/304,105

[22] Filed: Sep. 9, 1994

[51] Int. Cl.[7] ....................................................... C08L 5/12
[52] U.S. Cl. ........................................... 524/297; 524/547
[58] Field of Search ..................................... 524/297, 547

[56] References Cited

U.S. PATENT DOCUMENTS 4,387,172  6/1983  Agarwal ..................................... 524/60

*Primary Examiner*—Peter D. Mulcahy
*Attorney, Agent, or Firm*—Paul E. Purwin

[57] ABSTRACT

In its broadest sense of the present invention comprises an aqueous emulsion containing water, a normally thermoplastic sulfonated polymer and a plasticizer that is substantially miscible in the polymer is, non-volatile and substantially insoluble in the water phase of the emulsion.

The aqueous emulsion of the present invention is formed by polymerizing a sulfonate containing monomer with at least one non-sulfonate containing monomer in the aqueous phase in the presence of a free radical initiator and in the presence of a plasticizer that is substantially miscible in the polymer, is non-volatile and substantially water insoluble.

14 Claims, No Drawings

PLASTICIZED SULFONATED IONOMERS

FIELD OF THE INVENTION

This invention relates to plasticized polymeric ionomers, their method of preparation and use.

BACKGROUND OF THE INVENTION

Flexible polymeric compositions have been prepared from sulfonated thermoplastic ionomers by incorporating a plasticizer in the ionomer (see U.S. Pat. No. 3,870,841). In order to incorporate the plasticizer into the polymeric ionomer, the polymer and plasticizer are dissolved in an organic solvent and the resulting solution is subsequently evaporated to dryness. This technique, however, is relatively expensive and inefficient and therefore has limited usefulness.

Polymeric compositions comprising emulsions of thermoplastic sulfonated polymers can be prepared, for example, by copolymerizing alkali metal salts of styrene sulfonic acid using a free radical initiator with a variety of thermoplastic forming monomers such as styrene, t-butyl styrene, chlorostyrene and the like. This technique leads to emulsions containing a high solids content which would be particularly useful in forming flexible films if it were possible to plasticize the solids in the emulsion. Attempts, however, to plasticize emulsions of thermoplastic sulfonated polymers have not been successful. Apparently, the viscosity and relatively high glass transition of the thermoplastic polymer as well as the water insolubility of the plasticizer prevent diffusion of the plasticizer into the emulsified polymer.

The present invention seeks to provide an efficient and practical method for plasticizing normally thermoplastic sulfonated polymeric ionomer emulsion.

It is an object of the present invention to provide a novel aqueous emulsion of a plasticized sulfonated thermoplastic polymer.

It is another object of the present invention to provide a method for preparing such a composition.

It is yet another object of the present invention to provide a composition suitable for forming films and flexible elastic coatings from a normally nonelastic thermoplastic sulfonated polymeric ionomers.

SUMMARY OF THE INVENTION

In its broadest sense the present invention comprises an aqueous emulsion containing water, a normally thermoplastic sulfonated polymer and a plasticizer that is substantially miscible in the polymer and is non-volatile and substantially insoluble in the water phase of the emulsion.

The aqueous emulsion of the present invention is formed by polymerizing a sulfonate containing monomer with at least one non-sulfonate containing monomer in the aqueous phase in the presence of a free radical initiator and in the presence of a plasticizer that is substantially miscible in the polymer, and is non-volatile and substantially water insoluble.

The latex of this invention when dried to form films, coatings and other articles exhibits tough, flexible, coherent films and coatings of exceptional quality.

DETAILED DESCRIPTION OF THE INVENTION

Emulsions of sulfonated polymeric ionomers contemplated by the present invention include those that are readily prepared as emulsions via the copolymerization of at least one non-sulfonated monomer with a sulfonate containing monomer. Typical examples of a non-sulfonate containing monomers suitable in the practice of the present invention include styrene, substitute styrene such as t-butyl styrene, chloro-styrene, para-methyl styrene, vinyl toluene, alpha-methyl styrene and the like, vinylchloride, alkylacrylates and alkylmethacrylates wherein the alkyl group has from 1 to about five carbon atoms. Typical examples of a sulfonate containing monomers suitable in the practice of the present invention include alkali metal salts of styrene sulfonic acid, vinyl sulfonate, and acryloamidopropane sulfonic acid. Preferred are the alkali metal salts of styrene sulfonic acid.

In preparing the emulsions of the present invention, preferred combinations of one sulfonated and one non-sulfonated monomer include:

(1) styrene or substituted styrene with an alkali metal salt of sytrene sulfonic acid; and, (2) alkylacrylates or alkylmethacrylates with an alkali metal salt of acryloamidopropane sulfonic acid.

In preparing co- and terpolymer emulsions preferred combinations of more than one non-sulfonated and one sulfonated monomer include:

(1) styrene or a substituted styrene, as one monomer, an alkylacrylate or alkyl methacrylate as a second monomer with an alkali metal salt of styrene sulfonic acid; and, (2) styrene or a substituted styrene, as one monomer, an alkylacrylate or alkylmethacrylate as the second monomer, with an alkali metal salt of acryloamidopropane sulfonic acid.

The emulsion of the plasticized polymer is prepared by polymerizing the sulfonate containing monomer with at least one non-sulfonate containing monomer in the aqueous phase in the presence of a free radical initiator and in the presence of plasticizer.

In general, the ratio of water to monomers employed will be in the range of 10:1 to 1:2 and preferably 3:1 to 1:1.

The ratio of sulfonated containing monomer to non-sulfonated containing monomer or monomers will be sufficient to provide a sulfonated polymer containing from about 0.4 mole % to about 15 mole %, and preferably 1 mole % to 7 mole % sulfonate, based on weight of sulfonated thermoplastic polymer.

Any free radical initiator used in the emulsion polymerization of the previously identified monomers may be used in the present invention. These include potassium persulfate, hydrogen peroxide, benzoyl perioxide, and azo bis-isobutyronitrile. Typically the amount of initiator used will range from about 0.001 gm. to about 2 gm. per 100 gm. of the total weight of monomers present.

In general, the plasticizer will be one which is substantially miscible in the polymer and which is non-volatile and substantially water insoluble. By "non-volatile" is meant a plasticizer that has a normal boiling point of at least about 120° C. and preferably above about 150° C.; otherwise a product formed from the emulsion would lose plasticizer thereby resulting in an undesirable change in the physical properties of the product. By "substantially water insoluble" is meant a plasticizer that has a solubility in water of less than about 5 grams per 100 grams of water and preferably less than 2 grams/100 grams of water.

As a general rule, esters, glycolates, polyesters, phthalates are suitable plasticizers. Examples of preferred plasticizers include di-n-hexyl adipate, dicapryl adipate, di-(2-ethylhexyl adipate), di-butoxyethyl adipate, benzyloctyl adipate, tricyclohexyl citrate, phthalylbutyl glycolate, butyl laureate, n-propyl oleate, n-butyl palmitate, dibutyl phthalate, dihexyl phthalate, dioctyl phthalate, dioctyl sebacate and mixtures thereof. Additional examples of plasticizers can be found in the "Concise Encyclopedia of Polymer Science and Engineering", pg. 736, John Wiley and Sons (1990). Preferred plasticizers include di-alkyl phthalates having about 3 to 10 carbon atoms in the alkyl group.

The plasticized sulfonated polymer herein is dispersed in water thereby providing an emulsion or latex of the plasticized polymer.

The amount of plasticizer employed, of course, depends upon the desired properties of the final product. For example, large amounts of plasticizers (e.g. 100 pph) are useful in forming films of low modulus while low levels (e.g., 40 pph) are useful for films of higher modulus.

In general, the plasticizer will be employed at levels ranging from about 20 to about 150 parts of plasticizer per 100 parts of the finished sulfonated polymer, on a dry solids basis.

The above described process provides an emulsion comprising water, a normally thermoplastic polymer having about 0.4 mole % to about 15 mole % sulfonate and a plasticizer that is substantially diffused or dispersed in the sulfonated polymer.

Films can be formed from the emulsions of the present invention by film forming methods know in the art. For example, the emulsion can be spread on a moving belt or band where it is dried, usually at elevated temperatures, to produce a film with enough strength to be self-supporting at the point of removal from the belt or band. Alternatively, the emulsion can be cast on a rotating drum and again dried to form a film that is removalable from the drum. Alternatively, coatings can be applied to fabrics, paper and other substrates to form a plastic coated substrate.

EXAMPLE 1

This example illustrates the general method for forming a sodium neutralized styrene sulfonate latex in which the sulfonated copolymer is plasticized with dioctyl phthalate (DOP).

In a 500 ml. four-neck round bottom flask, equipped with a thermally controlled oil bath and fitted with a reflux condenser, nitrogen gas inlet, a air driven stirrer and thermometer is introduced 55.3 gm styrene, 150.0 ml distilled water, 5.0 gm of sodium lauryl sulfate, 2.0 gm of sodium styrene sulfonate, and 22 ml of DOP. The temperature is raised to 50° C. while the solution is continually degassed with nitrogen gas. The procedure takes approximately 1 hour. Subsequently, 0.4 gm potassium persulfate is dissolved in the mixture and an exotherm is noted within 1 hour. After about 24 hours, the product is cooled to room temperature. The resulting emulsion was stable, low in viscosity and showed no signs of phase separation at room temperature even after several weeks of storage.

COMPARATIVE EXAMPLE 1

This example illustrates the preparation of non-plasticized, lightly sulfonated polystyrene (S-PS) and the attempted formation of a film from that emulsion.

The same procedure used in Example 1 is followed except that the DOP is omitted and the level of sodium lauryl sulfate is reduced to 1 gm because the emulsion is more readily stabilized in the absence of DOP. The product is an emulsion of exceptional stability and very low viscosity.

When this emulsion is coated in a polytetrafluoroethylene lined aluminum pan, and dried overnight, the resultant product is incoherent, of no strength and is brittle. As such, the product cast from emulsion has no economic value as a film or coating.

COMPARATIVE EXAMPLE 2

This example illustrates an attempt at post plasticization of a non-plasticized emulsion of S-PS as prepared in Comparative Example 1.

The emulsion of Comparative Example 1 is employed and 60 parts of DOP are added to the emulsion containing 100 grams of copolymer and mixed thoroughly. Then a film is cast from the DOP-containing emulsion in a manner similar to Comparative Example 1. The mixture is dried overnight and the resultant product is an non-homogeneous goop, where a liquid which is apparently DOP is present as one phase, and another phase appears to be brittle S-PS. Again this product is of little practical value as a film or coating.

COMPARATIVE EXAMPLE 3

This example illustrates an alternate attempt at post plasticization of a non-plasticized S-PS emulsion.

The emulsion of Comparative Example 1 is employed. Also used is an emulsion of 60 parts of DOP in water emulsified with sodium docyl sulfate as surfactant. The polymer and DOP emulsions are blended to create a system which offers an improved chance for homogeneity between polymer and DOP. The mixture is cast as a film as above. Again an non-homogeneous film of little practical value is obtained. There appears to be two types of particles, one is brittle, the other appears to be largely DOP. There is some improvement over Comparative Example 2 but not to any substantial extent.

EXAMPLE 3 AND 4

Following the procedure outlined in Example 1, two emulsions were prepared, one containing 40 parts per hundred of DOP and a second containing 60 parts per hundred of DOP. These emulsions were used to prepare a coating of the plasticized polymer by depositing the latex to a polytetrofluoroethylene pan and then drying the latex. The latex having 40 DOP was dried at 60° C. while that having 60 parts DOP was dried at 25° C. The coating based on 60 parts DOP was tough, flexible and coherent, while the coating based on 40 parts DOP was less uniform but still coherent. The result in each instance was a coating of a tough, flexible, polymeric material of exceptional quality.

What is claimed is:

1. An emulsion consisting essentially of:
   water;
   a normally thermoplastic polymer having about 0.4 mole % to about 15 mole % of sulfonate; and
   a plasticizer that is substantially miscible with the polymer, non-volatile and substantially insoluble in the water phase of the emulsion, the plasticizer being selected from the group consisting of esters, glycolates, phthalates, esters of organic acids, alcohols of polyesters, and mixtures thereof.

2. The emulsion of claim 1 wherein the emulsion contains about 20 to about 150 parts by weight of plasticizer, based on the weight of polymer.

3. The emulsion of claim 2 wherein the polymer is a co or terpolymer of at least one non-sulfonate containing monomer selected from the group consisting of styrene, substituted styrene, vinyl chloride, alkylacrylates and alkylmethacrylates wherein the alkyl group has from 1 to about 5 carbon atoms and a sulfonate containing monomer selected from the group consisting of alkali metal salts of styrene sulfonic acid, vinyl sulfonate and acryloamido propane sulfonic acid.

4. The emulsion of claim 2 wherein the normally thermoplastic sulfonated polymer is a sulfonated polystyrene polymer.

5. The emulsion of claim 4 wherein the plasticizer is a di-alkyl phthalate having from about 3 to 13 carbon atoms in the alkyl group.

6. A plasticized thermoplastic sulfonated polymer emulsion formed by polymerizing in an aqueous media, a sulfonate containing monomer with at least one non-sulfonate containing monomer in the presence of plasticizer that is substantially miscible with the polymer, non-volatile and substantially insoluble in the aqueous media, the monomers being capable of being polymerized to form a thermoplastic polymer, and the plasticizer being selected from esters, glycolates, di-alkyl phthalates, esters of organic acids, polyesters, and mixtures thereof.

7. The emulsion of claim 6 wherein sulfonate and non-sulfonate containing monomers are present in amounts sufficient to provide a sulfonated polymer having from about 0.4 mole % to about 15 mole % of sulfonate.

8. The emulsion of claim 7, wherein the non-sulfonated containing monomer is selected from the group consisting of styrene, substituted styrene, vinyl chloride, alkylacrylates and alkylmethacrylates wherein the alkyl group has from 1 to about 5 carbon atoms, and the sulfonated monomer is selected from the group consisting of alkali metal salts of styrene sulfonic acid, vinyl sulfonate and acryloamidopropane sulfonic acid.

9. The emulsion of claim 8, wherein the plasticizer is selected from esters, glycolates, di-alkyl phthalates, esters of organic acids, polyesters, and mixtures thereof.

10. The emulsion of claim 8, wherein the non-sulfonated monomer is styrene or a substituted styrene and the sulfonated monomer is an alkali metal salt of styrene sulfonic acid.

11. The emulsion of claim 8, wherein one non-sulfonated monomer is styrene or a substituted styrene and a second non-sulfonated monomer is an alkylacrylate or alkylmethacrylate.

12. The emulsion of claim 11, wherein the sulfonated monomer is an alkali metal salt of styrene sulfonic acid.

13. The emulsion of claim 12 wherein the plasticizer is a di-alkyl phthalate having from 3 to 13 carbon atoms in the alkyl group.

14. A film formed from the emulsion of claim 1.

* * * * *